Feb. 11, 1941.   S. L. KERR   2,231,828
APPARATUS FOR FRACTIONAL DISTILLATION
Filed Aug. 20, 1938   4 Sheets-Sheet 1
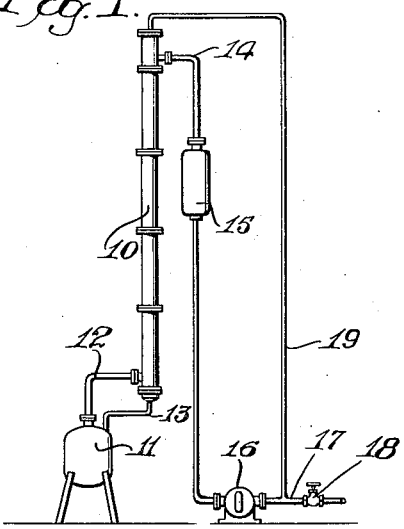
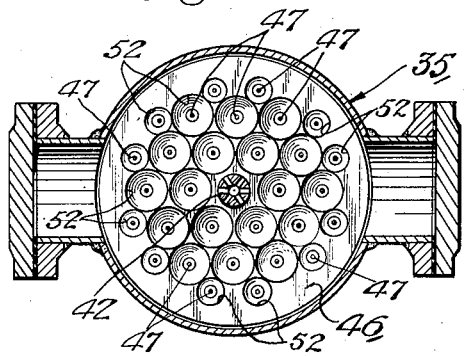
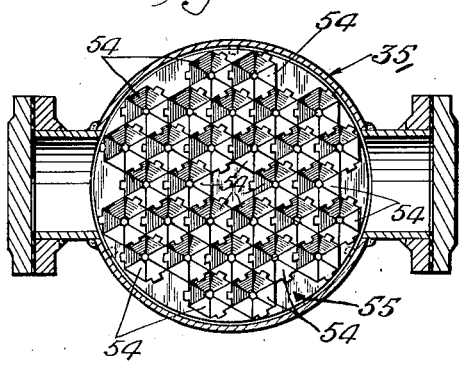
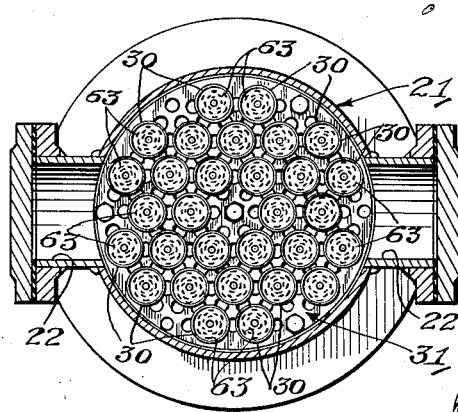
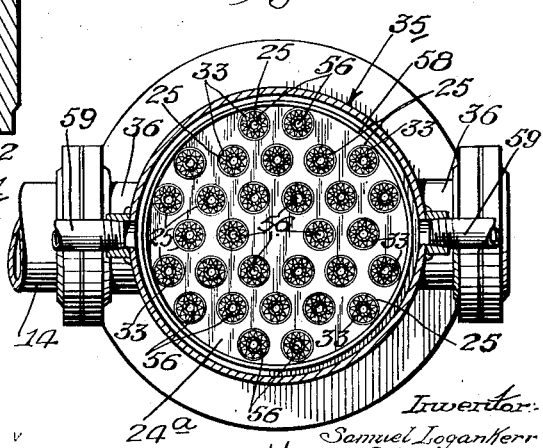
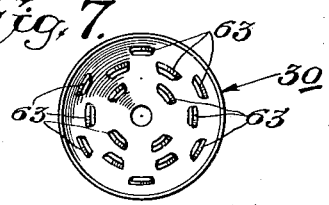

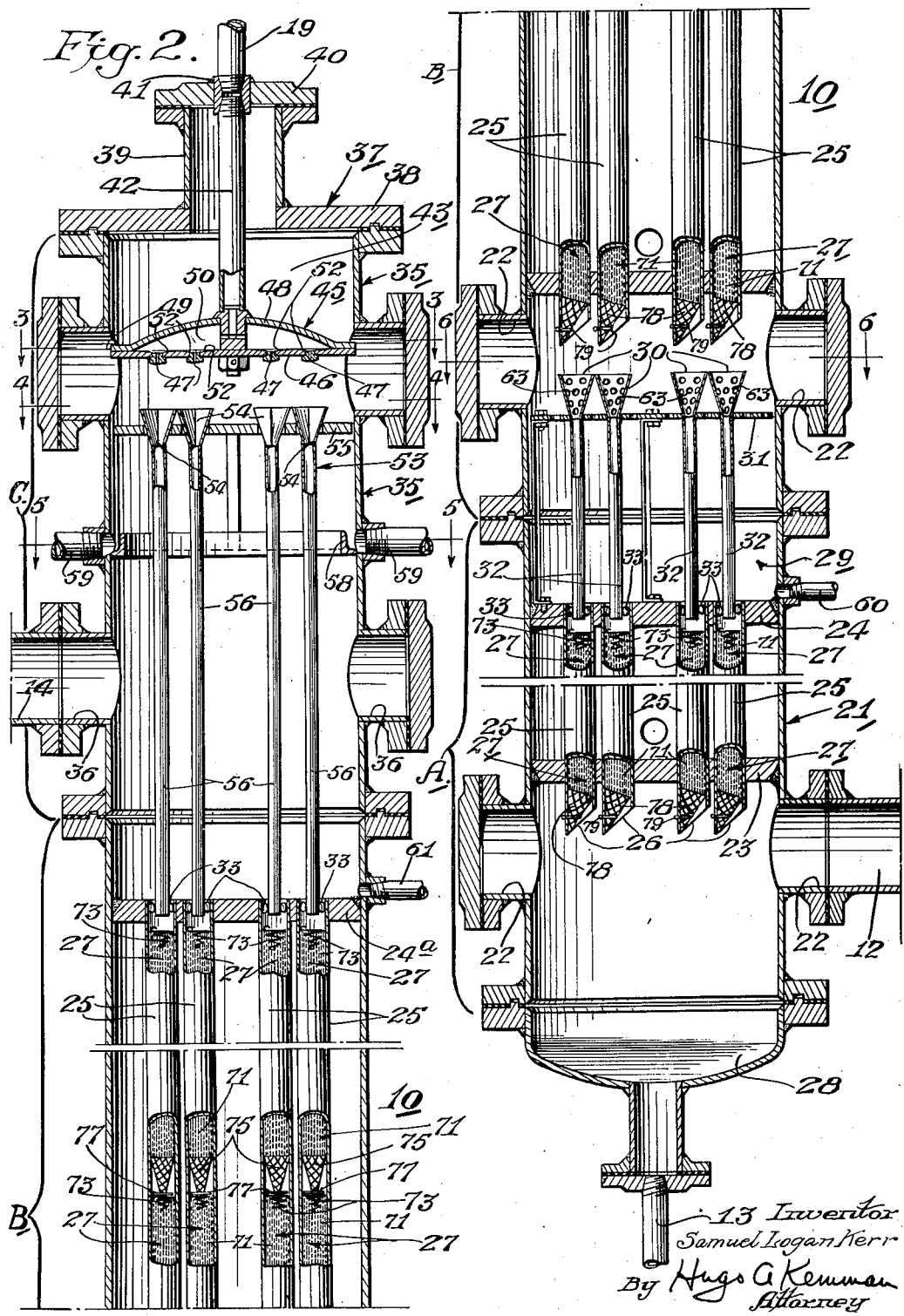

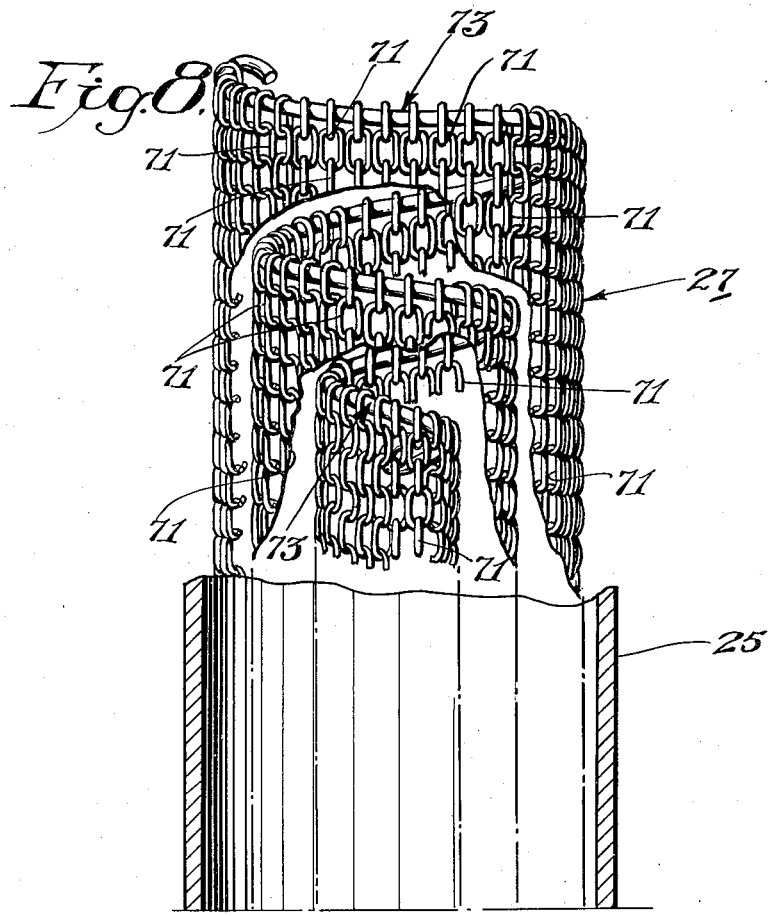
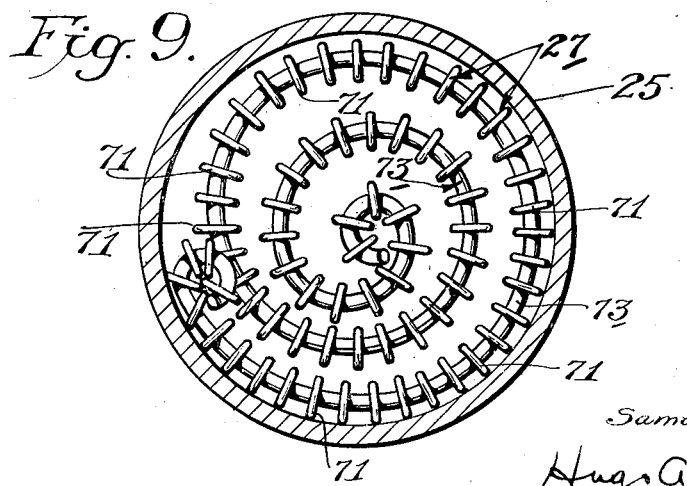

Feb. 11, 1941.　　　　S. L. KERR　　　　2,231,828
APPARATUS FOR FRACTIONAL DISTILLATION
Filed Aug. 20, 1938　　　4 Sheets-Sheet 4
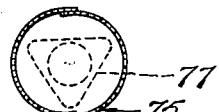
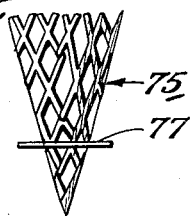
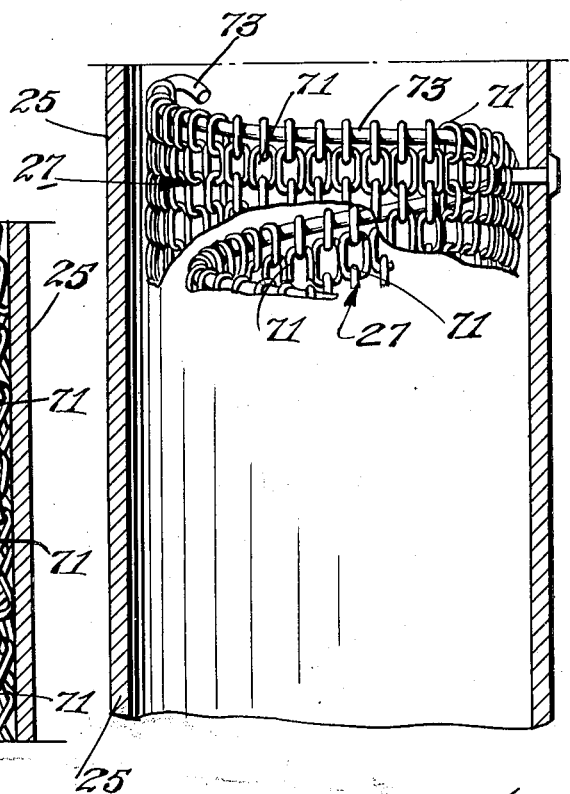
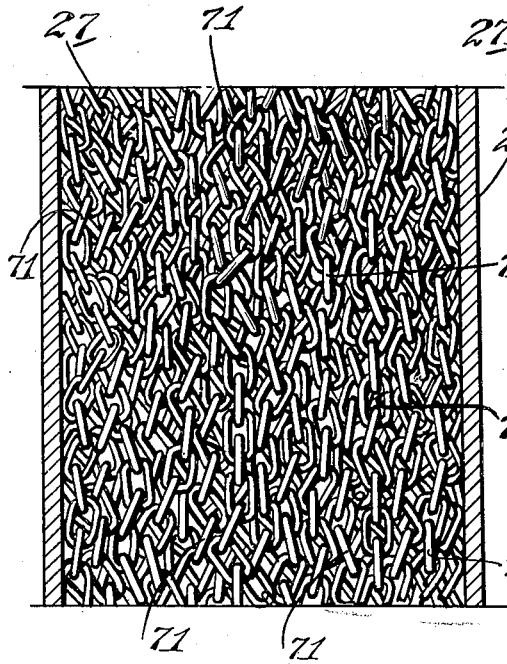
Inventor:—
Samuel Logan Kerr
By Hugh G. Kenman
Attorney

Patented Feb. 11, 1941

2,231,828

UNITED STATES PATENT OFFICE 2,231,828

APPARATUS FOR FRACTIONAL DISTILLATION

Samuel Logan Kerr, Philadelphia, Pa., assignor to The United Gas Improvement Company, a corporation of Pennsylvania Application August 20, 1938, Serial No. 225,902

8 Claims. (Cl. 261—96)

This invention pertains generally to the fractionation of mixtures and pertains particularly to multi-tubular columns employed for this purpose.

The invention pertains more particularly to a multi-tubular column of improved design.

The desideratum in the operation of a multi-tubular column is to effect exactly the same degree of fractionation in each fractionating tube so that the rectified vapor leaving any one fractionating tube will be of exactly the same composition as the rectified vapor leaving any other fractionating tube.

In seeking to approach these results as nearly as practicable it is found, among other things, to be essential to maintain the same proportion of descending reflux liquid to ascending vapor in each fractionating tube.

One method for accomplishing this is disclosed in U. S. Patent Number 2,037,316 by Merrell R. Fenske, granted April 14, 1936. According to the method of this patent the rectified vapor from each separate fractionating tube is accurately proportioned between reflux and product, and the reflux portion of the rectified vapor of each tube is separately condensed and returned to the fractionating tube from whence it came.

I have discovered that the construction of multi-tubular columns may be greatly simplified by employing my new method for obtaining the same proportion of reflux liquid to vapor in each fractionating tube.

A second essential for highly efficient fractionation is to bring the liquid and vapor into intimate contact throughout the length of each individual fractionating tube, and to avoid differences in intimacy of contact of liquid and vapor among various tubes.

In other words the efficiency of fractionation in any tube is also dependent upon the degree of uniformity of dispersion of the liquid throughout the vapor.

The purpose of uniformly and widely dispersing the reflux liquid throughout the vapor is to make it possible for each particle of reflux liquid to be in substantial equilibrium at each moment of time with the vapor then in contact with it. As the particle of reflux liquid descends through the tube countercurrently to the ascending vapor it is necessary for it to gradually change in composition to be in equilibrium with the counterflowing vapor.

Another essential for highly efficient fractionation is the reduction of longitudinal diffusion in each individual phase (liquid or vapor) to a minimum. In other words, since one of the requirements of efficient fractionation by the countercurrent contact of vapor and liquid is that each phase have an incremental charge in composition for each increment of length of contact, it is important to overcome as much as possible the forces of nature tending to bring each phase to a homogeneous state.

The last two essentials are met to a degree by the use of tubes of relatively small cross-sectional area, capacity requirements being met by multiplying the number of tubes. I find, however, that small tubular cross sectional area alone is not sufficient, and that thought must be given to the internal structure of the tubes.

The means usually employed for dispersing the liquid phase throughout the vapor phase comprises an interior tubular structure of a character affording not only a very high free space, say of the order 85% of the total volume, but also a very large surface area to be wetted by the liquid phase thus accomplishing its dispersion.

Packing materials of a wide variety have been used for this purpose such as raschig rings, glass beads, carpet tacks, carding teeth, jack chain and the small wire shapes disclosed in U. S. Patent Number 2,037,317 by Merrell R. Fenske granted April 14, 1936.

The large surface area and the high free space should, of course, be uniformly distributed so that uniform dispersion of the liquid phase may be an accomplished fact, or in other words, so that channeling may be avoided.

It is my experience that when the packing arrangements of the prior art are employed it is difficult to obtain uniform distribution of the liquid phase, for even though a substantially uniform distribution of the packing is obtained, the descending liquid, nevertheless, has a greater tendency to follow the wall of the tube.

I have discovered a new way of packing fractionating tubes whereby a high degree of dispersion of the liquid phase is obtained and maintained and whereby longitudinal diffusion in each phase and channeling are reduced to a minimum.

Other features of the invention reside in the construction, arrangement and combination of parts, and in the steps, combinations of steps, and sequences of steps, all of which together with other features will become more apparent to persons skilled in the art as the specification proceeds and upon referring to the drawings in which:

Figure 1 is an elevation illustrating a column together with its accessories;

Figure 2 is a sectional elevation of the column of Figure 1;

Figure 3 is a section on line 3—3 of Figure 2;

Figure 4 is a section on line 4—4 of Figure 2;

Figure 5 is a section on line 5—5 of Figure 2;

Figure 6 is a section on line 6—6 of Figure 2;

Figure 7 is a plan of a reflux collecting funnel;

Figure 8 is an elevation illustrating a manner of packing a tube;

Figure 9 is a plan of Figure 8;

Figure 10 is an elevation of a packed tube showing the packing collapsed;

Figure 11 is an elevation of a packed tube showing the packing uncollapsed;

Figure 12 is an elevation of a redistributor;

Figure 13 is a plan of the redistributor of Figure 12; and

Figure 14 is an elevation of a supporting redistributor.

Referring now more particularly to Figure 1 at 10 is shown a column. 11 is a still adapted to deliver vapor to column 10 through line 12 and to receive liquid reflux from column 10 through line 13.

Rectified vapor leaves column 10 at 14, is condensed by condenser 15 and the condensate is delivered to pump 16. The outlet of pump 16 is branched between product draw-off line 17 controlled by valve 18, and reflux line 19 which leads to the top of tower 10 and delivers reflux liquid thereto.

Column 10 is shown in detail in Figure 2 and for convenience in description will be referred to as made up of superimposed sections A, B and C.

Referring now more particularly to section A, 21 is a shell provided at its lower end with opposed openings 22, one of which is closed and the other of which is connected to line 12 of Figure 1. These and other openings 22 in addition to providing vapor connections also provide means for ready access to the interior of the column for inspection, adjustment of parts, etc.

Shell 21 is provided with spaced tube sheets 23 and 24 in which are mounted a plurality of parallelly arranged fractionating tubes 25, the upper ends of which are shown flush with the upper surface of tube sheet 24 and the lower ends of which project down below tube sheet 23. The lower ends of tubes 25 as illustrated are scarfed as shown at 26.

Each of the tubes 25 contains a phase contacting medium such as packing illustrated at 27. This packing is preferably of a special type and arrangement to be hereinafter more particularly described.

Section A at its lower end is connected, such as by suitable flanges, to a reflux collecting chamber 28 which in turn is connected to line 13 of Figure 1.

The upper end of section A is connected, such as by suitable flanges, to the lower end of section B.

Section B as shown is constructed in all respects similar to section A. Opposed openings 22 of section B, however, are closed.

The uppermost portion of section A and the lowermost portion of section B are constructed in a manner to form a pressure equalizing and vapor mixing chamber 29.

Within chamber 29 is provided a reflux segregating device comprising a plurality of funnels 30 supported by a perforated plate 31. Each funnel 30 has a long stem 32 which projects down into a separate tube 25 of section A and is centered therein by means of a centering spring 33. While funnels 30 are shown perforated for purposes which will lhereinafter appear, it is to be understood that these funnels may be solid without departing from the spirit of the invention.

Each funnel 30 is positioned directly below a separate tube 25 of section B so as to connect, for the purposes of liquid phase flow, each tube 25 of section B with a separate tube 25 of section A the purposes of which will hereinafter appear.

The arrangement of funnels 30 can be seen in plan in Figure 6.

Superimposed upon section B and connected thereto, such as by flanges, is a vapor segregating and reflux feeding section C.

Shell 35 of section C is provided at its lower end with opposed tubular openings 36, one of which is closed and the other of which comprises an outlet for rectified vapor which is delivered to line 14 of Figure 1.

The upper end of shell 35 is closed by reflux distributor suport 37 which is shown as comprising a plate 38 attached to shell 35, such as by flanges, and having an upwardly projecting tubular portion 39 closed by a plate 40 has an interiorly threaded portion 41 which serves to connect line 19 of Figure 1 to tubular stem 42 of reflux distributor 43.

Stem 42 is connected to reflux distributor head 45 which as shown comprises a flat lower plate 46 in which are arranged a plurality of metering orifices 47, and an upper plate 48 having its peripheral edge 49 secured to plate 46, such as by welding. If desired, plates 46 and 48 might be secured together by bolts in which case a gasket would preferably be used between the parts. Such construction would permit ready disassembly for inspection and/or cleaning.

The center portion of plate 48 is curved away from plate 46 so as to provide a reflux feeding chamber 50 for delivering reflux liquid to orifices 47.

The upper surface of plate 46 is shown more clearly in Figure 3. It is preferred to provide each orifice 47 with an encircling countersunk portion 52 in the upper surface of plate 46 to facilitate drainage of chamber 50, and to provide uniform conditions of feed to each orifice.

Metering orifices 47 are of the same number as tubes 25 of section B.

Positioned within shell 35 below reflux distributor 43 is an arrangement 53 comprising a plurality of hexagonal funnels 54 supported by a plate 55. Each funnel 54 has a stem 56 which projects down into a separate tube 25 of section B and is centered therein by means of a centering spring 33.

The contiguous arrangement of funnels 54 can be more clearly seen in Figure 4. Any other funnel arrangement or shape might be substituted although the advantages of the hexagonal form as illustrated in Figure 4 will be at once apparent to persons skilled in the art. The arrangement of centering springs 33 can be more clearly seen in Figure 5.

Shell 35 is shown provided on its inner wall at a point below funnels 54 with an annular well 58 for collecting and draining any overflow of reflux liquid in the event of improper feeding thereof. Well 58 is provided with suitable drains illustrated at 59.

Likewise reflux drains are provided just above tube sheet 24 of section A and tube sheet 24a of section B as illustrated at 60 and 61 respectively, the purpose of which is to drain any accumulation of liquid in the event of improper operation of the column.

An enlarged plan view of a funnel 30 is shown in Figure 7. It should be noted that the perforations are provided with inwardly projecting flanges 63 which may be made, if desired, by punching the metal inwardly when forming the perforations.

While broadly speaking the invention includes the use of any form of packing in tubes 25 of sections A and B, I find it particularly advantageous for obtaining intimate contact between vapor and liquid without channelling and for reducing longitudinal diffusion in the individual phases to a minimum to have a particular type and arrangement of packing.

I prefer to have a plurality of linear arrangements of the packing in each tube so that the descending reflux liquid will not only be guided linearly in a vertical direction from top to bottom of each tube but will also be held in distributed relation with respect to the cross-section of the tube.

One manner of accomplishing this result is illustrated in Figures 8, 9, 10 and 11 of the drawings.

A section of a tube in the process of being packed is illustrated in Figures 8 and 9. This tube after being packed is illustrated in Figure 10.

Referring more particularly to Figure 8 packing 27 is illustrated as comprising a plurality of separate strands 71 of jack chain in the process of being lowered into a tube 25.

The strands of jack chain 71 are shown strung on a helical coil 73 the purpose of which is twofold, namely (1) to bring the strands of jack chain together as compactly as possible by whatever overlapping or intermeshing of the links may be required depending upon the shape of the individual links and (2) to fill the entire cross-section with vertically depending strands 71. The pitch of the helical coil 73 and the number of turns are chosen according to the size and type of jack chain employed so that this result may be accomplished.

Since the strands 71, as arranged on the helical coil 73, substantially fill the entire cross-section as compactly as possible while being inserted into a tube 25, these strands even when collapsed as illustrated in Figure 10, still maintain a substantially vertical arrangement. In view of the compact arrangement of the strands the individual links at any cross-section are also held more or less in a vertical position.

This method permits the insertion of a substantial maximum packing merely by permitting the packing to settle by gravity and without the necessity of vibrating the tube such as by constant hammering.

However, if desired, and particularly to obtain a more uniform density, the tubes 25 may be vibrated during packing such as with an air hammer.

The position of the links of strands 71 when the packing is collapsed is illustrated in Figure 10.

On the other hand, if more free space is desired the depending strands 71 may be supported in uncollapsed condition, if desired, by securing the helical coil 73 at the top of tube 25 in any desired manner such as by pins extending through the sidewall of the tube, and using shorter strands 71 of jack chain. This is illustrated in Figure 11.

Because of the difficulty of clearly showing a large number of strands of jack chain in close relationship each containing a large number of links, it will be understood that Figures 8 to 11 are merely diagrammatic and illustrative.

While the strands 71 of any one packing assembly may be of sufficient length to fill the entire tube, it is to be understood that the strands 71 may be of shorter length, and that any desired or required number of groups of strands 71, each group held together for instance as by a helical coil 73, may be inserted one on top of the other until the tube is packed over the desired length.

Furthermore, there may be one or more breaks in the packing in each tube to permit the insertion of one or more redistributor 75 as illustrated in Figure 2.

Redistributor 75 comprises an open mesh work of conical shape having a base of sufficient diameter to contact the walls of the tube to skim descending reflux liquid therefrom, and a centering member 77 adjacent the apex for centering the apex. Redistributor 75 is shown in more detail in Figures 12 and 13.

As clearly shown in Figure 2 centering member 77 rests upon the packing immediately beneath it and redistributor 75 in turn supports the packing above it.

The operation of redistributor 75 will be hereinafter more particularly set forth.

By removing the centering member 77 from the redistributor 75, as illustrated at 78 in Figure 14, a combined support and redistributor is obtained for supporting the packing in the lower portions of the tubes 25 and for collecting and causing the reflux liquid to drop from the extreme lower tips of the scarfed lower ends 26 of tubes 25.

Supporting redistributors 78 may be secured in the lower ends of tubes 25 in any desired manner such as illustrated at 79.

While I have illustrated only one redistributor 75 in each tube 25 of sections A and B, it is to be understood that any number of redistributors may be inserted in these tubes. In fact a larger number is desirable when other arrangements of packing are employed since in other arrangements the reflux liquid tends to concentrate on the walls of the tubes more quickly.

Furthermore, while I have particularly illustrated procedure for packing the tubes 25 in a preferred manner, it is to be understood that this may be accomplished in any other manner. For instance, tubes 25 may be fitted with removable sleeves and these sleeves may be packed and matched prior to insertion in tubes 25. Any means may be employed for holding the packing in such sleeves and the sleeves may or may not have perforated or reticular sidewalls. Redistributors may be arranged within the sleeves and/or between the sleeves if desired to conduct reflux liquid to the approximate cross-sectional center of tubes 25.

The operation of column 10 is as follows:

Vapor produced in still 11, due to the boiling of the liquid mixture to be separated, enters column 10 through line 12 and, care having been taken to see that the tubes 25 of any one section have substantially the same resistance to the flow of vapor and the tubes 25 being of the same diameter, the vapor ascends through each tube 25 of section A at the same rate. While passing up through tubes 25 the vapor is intimately contacted with descending liquid reflux.

In view of the vertical arrangement of the strands of jack chain, and of the individual links of the strands, the tendency of the liquid reflux to concentrate on the walls of the tubes is greatly reduced.

Since this tendency may not be entirely overcome, or should the ordinary arrangement of packing be employed, I prefer at intervals to conduct the reflux liquid to the center of the tube where it is again brought into contact with the packing. This is accomplished by the redistributor 75 which skims the liquid from the wall of the tube and collects it from the packing and conducts it to the center. The liquid then recontacts the packing and continues down through the tube.

The reticular construction of the redistributors 75 permits the vapor to pass upwardly therethrough.

The supporting redistributors 78 at the bottoms of the tubes 25 of section A similarly skim the reflux liquid from the walls of the tubes and collect it from the packing and conduct it to the lowermost tips of the scarfed ends 26 from which it drips down into the collecting chamber 28 from which it is conducted through line 13 back to still 11.

The vapor escaping from the upper ends of tubes 25 of section A passes up around the stems 32 of funnels 30, up through perforated plate 31, up around and up through perforated funnels 30 where it enters tubes 25 of section B and ascends therethrough.

The contact of liquid and vapor in section B is in all respects similar to that in section A.

The reflux liquid dropping from the extreme lower ends of tubes 25 of section B is collected by the individual funnels 30 and is conducted around the apertures in funnels 30 by inwardly projecting flanges 63 thus avoiding loss of reflux liquid through the perforations.

The reflux liquid from each individual tube 25 of section B enters a separate funnel 30, descends down through the stem 32 thereof, and enters a separate tube 25 of section A.

By this means the relative distribution of liquid reflux between the tubes 25 of section B is maintained in the tubes 25 of section A.

By releasing the vapor from section A into chamber 29 slight differences in pressure drop in section A are equalized and the vapor enters tubes 25 of section B at the same pressure.

Vapor escaping from the upper ends of tubes 25 of section B flows out through an opening 36 into line 14 and is condensed at 15. The condensate flows to pump 16 and is proportioned between reflux and product by the operation of valve 18 in product take off line 17. That portion of the condensate which is not taken off as product is returned through line 19 to the top of column 10 as liquid reflux.

This liquid reflux flows down through stem 42 of reflux distributor 43, and enters chamber 50 where it is equally proportioned by metering orifices 47. The flow from each orifice enters a separate funnel 54 and flows down through its stem 56 into a separate tube 25 of section B.

Since the tubes 25 of section B are matched as to pressure drop the same as those of section A, the vapor ascends at substantially the same rate through each of its tubes, and since liquid reflux is equally proportioned between its tubes, the same proportion of liquid reflux to vapor is maintained in each tube 25 of section B.

Since the liquid reflux from each tube 25 of section B is conducted down into a separate tube 25 of section A, and since the tubes 25 of section A have also been matched as to pressure drop so that vapor ascends through each tube at the same rate, the same proportion of liquid reflux to vapor is also maintained in the tubes of section A.

My new method of packing the tubes of tubular fractionating columns makes it possible readily to obtain the same pressure drop through each of the tubes. The tubes not only tend to be of the same pressure drop when the same quantity of packing is inserted, but the arrangement of the packing makes it possible readily and easily to repack or adjust the quantity of packing in any tube should the pressure drop depart too greatly from the chosen standard.

The pressure drop, or, in other words, resistance to fluid flow, may be readily measured, for the purpose of bringing the pressure drop in tubes 25 to the chosen standard, by blowing air up through the individual tubes at a standard rate and noting the pressure drop obtained.

Other methods of standardizing the pressure drops through the tubes 25 will suggest themselves to persons skilled in the art upon becoming familiar with this invention.

While the invention has been described in connection with two fractionating sections, A and B, it is to be understood that this is not by way of limitation and that any number of fractionating sections may be employed, that is, one or more. Should only one fractionating section be desired it is merely necessary to remove section A and connect chamber 28 and line 12 to the bottom of section B in the same manner as illustrated at the bottom of section A. On the other hand, should more fractionating sections be desired it is merely necessary to insert them between sections B and C. The connection between such additional sections and the connection between the lowermost additional section and section B may be the same as illustrated between sections A and B, and the connection between the uppermost additional section and section C may be the same as illustrated between sections B and C.

It is, of course, understood that the fractionating sections, of which sections A and B are examples, may be of any desired length.

My new column makes it possible to take off side streams in any desired number. For instance a side stream a vapor might be taken off through one of the opposed openings 22 at the bottom of section B.

Although column 10 has been described as an enriching column, it is to be understood that it may be operated in any other desired manner. For instance should it be desired to operate column 10 as a stripping column the necessary changes, which are well understood in the art, may be made for this purpose. As an example valve 18 might be closed, and the mixture to be stripped might be fed into pump 16 along with the condensate. The resulting liquid mixture would be fed into the top of column 10 and the product would be withdrawn from still 11 or from line 13.

On the other hand should it be desired to operate continuously the mixture to be separated may be vaporized in a separate still and fed into the column through one of the openings 22 at the bottom of section B. One product would be withdrawn at 17 in the regular way and the other would be withdrawn from still 11 or line 13. Side streams in the vapor or liquid phase might be removed. For instance, a convenient way of removing a vapor sidestream is through an opening 22. In continuous distillation the taking off of sidestreams is made more convenient when using more than two fractionating sections. Sidestreams may be taken off either above or below the point of feed or both.

Many other variations will suggest themselves to persons skilled in the art upon becoming familiar herewith.

It is, of course, obvious that column 10 may be lagged in any desired manner to obtain adiabatic conditions, or the shells 21 may be filled with a heat insulating material such as rock wool for this purpose. Shells 21 are also adapted for the flow of a fluid medium such as steam, water, brine, etc., for heat control purposes making it possible to obtain either substantially adiabatic conditions or any desired degree of dephlegmating, or even superheating should this be desired for any purpose. Such fluid medium might be used to bring the column up to temperature previous to starting.

The term "a plurality of linear arrangements of packing" or its equivalent, as used in the claims, is intended to define a compact grouping of packing elements wherein the individual packing elements are arranged so as to be for the most part vertical or substantially so.

Also in the claims the term "linearly conducting the liquid phase" or its equivalent, is intended to define the condition under which the component of lateral flow is very substantially reduced.

Therefore, it is to be understood that the above particular description is by way of illustration and that changes, omissions, additions, substitutions and/or modifications might be made within the scope of the claims without departing from the spirit of the invention.

I claim:

1. Apparatus comprising a fractionating column having as phase contacting means a plurality of uprightly arranged linked strands compactly consolidated laterally in a manner to cause intermeshing of links while retaining in said uprightly arranged strands a linear-like configuration, means for delivering fluid to said column for upward flow therethrough, and means for delivering liquid to said column for downward flow therethrough.

2. Apparatus comprising a fractionating column having as phase contacting means a plurality of uprightly arranged strands of chain compactly consolidated laterally and collapsed vertically in a manner to retain in said uprightly arranged strands a linear-like configuration, means for delivering fluid to said column for upward flow therethrough, and means for delivering liquid to said column for downward flow therethrough.

3. Apparatus comprising a fractionating column having as phase contacting means a plurality of uprightly arranged strands of chain compactly consolidated laterally in a manner to cause intermeshing of chain links and extended vertically in a manner to retain in said uprightly arranged strands a linear-like configuration, means for delivering fluid to said column for upward flow therethrough, and means for delivering liquid to said column for downward flow therethrough.

4. Apparatus comprising a fractionating column having as phase contacting means a plurality of sets of uprightly arranged linked strands compactly consolidated laterally in a manner to cause intermeshing of links while retaining in said uprightly arranged strands a linear-like configuration, said sets being arranged end to end, means between adjacent ends of said sets for laterally collecting downwardly flowing liquid and for depositing said collected liquid at the approximate cross sectional center of said column, means for delivering fluid to said column for upward flow therethrough, and means for delivering liquid to said column for downward flow therethrough.

5. A fractionating column comprising a plurality of fractionating units uprightly arranged and connected in parallel, each of said fractionating units having as phase contacting means a plurality of uprightly arranged linked strands compactly consolidated laterally in a manner to cause intermeshing of links while retaining in said uprightly arranged strands a linear-like configuration, means for delivering fluid to said column for upward flow therethrough, means for dividing said fluid proportionately between said fractionating units, means for delivering liquid to said column for downward flow therethrough, and means for dividing said liquid proportionately between said fractionating units.

6. A fractionating column comprising a plurality of fractionating units uprightly arranged and connected in parallel, each of said fractionating units having as phase contacting means a plurality of uprightly arranged strands of chain compactly consolidated laterally and collapsed vertically in a manner to retain in said uprightly arranged strands a linear-like configuration, means for delivering fluid to said column for upward flow therethrough, means for dividing said fluid proportionately between said fractionating units, means for delivering liquid to said column for downward flow therethrough, and means for dividing said liquid proportionately between said fractionating units.

7. A fractionating column comprising a plurality of fractionating units uprightly arranged and connected in parallel, each of said fractionating units having as phase contacting means a plurality of uprightly arranged strands of chain compactly consolidated laterally in a manner to cause intermeshing of chain links and extended vertically in a manner to retain in said uprightly arranged strands a linear-like configuration, means for delivering fluid to said column for upward flow therethrough, means for dividing said fluid proportionately between said fractionating units, means for delivering liquid to said column for downward flow therethrough, and means for dividing said liquid proportionately between said fractionating units.

8. A fractionating column comprising a plurality of fractionating units uprightly arranged and connected in parallel, each of said fractionating units having as phase contacting means a plurality of sets of uprightly arranged linked strands compactly consolidated laterally in a manner to cause intermeshing of links while retaining in said uprightly arranged strands a linear-like configuration, said sets in each of said fractionating units being arranged end to end, means between adjacent ends of said sets in each fractionating unit for laterally collecting downwardly flowing liquid and for depositing said collected liquid at the approximate cross sectional center of said fractionating unit, means for delivering fluid to said column for upward flow therethrough, means for dividing said fluid proportionately between said fractionating units, means for delivering liquid to said column for downward flow therethrough, and means for dividing said liquid proportionately between said fractionating units.

SAMUEL LOGAN KERR.